United States Patent
Hirata et al.

(10) Patent No.: US 10,599,166 B2
(45) Date of Patent: Mar. 24, 2020

(54) VALVE CONTROL DEVICE

(71) Applicant: SHIMADZU CORPORATION, Kyoto (JP)

(72) Inventors: Nobuyuki Hirata, Kyoto (JP);
Junichiro Kozaki, Kyoto (JP); Atsuo Nakatani, Kyoto (JP); Masaya Nakamura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/863,883

(22) Filed: Jan. 6, 2018

(65) Prior Publication Data

US 2018/0196449 A1    Jul. 12, 2018

(30) Foreign Application Priority Data

Jan. 12, 2017   (JP) .................................. 2017-003447

(51) Int. Cl.

| G05D 16/20 | (2006.01) |
| F16K 31/04 | (2006.01) |
| F16K 3/02 | (2006.01) |
| F16K 3/04 | (2006.01) |
| F16K 51/02 | (2006.01) |

(Continued)

(52) U.S. Cl.
CPC ......... *G05D 16/202* (2013.01); *F16K 3/0227* (2013.01); *F16K 3/04* (2013.01); *F16K 3/06* (2013.01); *F16K 3/10* (2013.01); *F16K 31/041* (2013.01); *F16K 37/005* (2013.01); *F16K 37/0041* (2013.01); *F16K 51/02* (2013.01); *G05D 16/024* (2019.01)

(58) Field of Classification Search
CPC ... F16K 51/02; H01J 37/32834; G05D 16/202
See application file for complete search history.

(56) References Cited

U.S. PATENT DOCUMENTS

| 5,944,049 A | * | 8/1999 | Beyer | ..................... F04B 49/08 |
| | | | | 137/14 |
| 6,022,483 A | * | 2/2000 | Aral | ........................ B01J 3/006 |
| | | | | 156/345.26 |

(Continued)

FOREIGN PATENT DOCUMENTS

JP        4630994        2/2011

*Primary Examiner* — Reinaldo Sanchez-Medina
*Assistant Examiner* — Nicole Gardner
(74) *Attorney, Agent, or Firm* — Renner, Otto, Boisselle & Sklar, LLP (57) ABSTRACT

A valve control device configured such that a pressure measurement value of a chamber, a target pressure value of the chamber, and an opening degree measurement value of the vacuum valve are input to the valve control device and configured to control an opening degree of the vacuum valve based on a deviation between the pressure measurement value and the target pressure value, comprises: a storage storing a correlation between the opening degree of the vacuum valve and a conductance of a system including the vacuum valve; and a correction gain setting section obtaining, based on the correlation, a change rate of the conductance in association with an opening degree change at the input opening degree measurement value, thereby setting an inverse of the change rate as a correction gain. The opening degree of the vacuum valve is controlled based on the deviation and the correction gain.

7 Claims, 8 Drawing Sheets

(51) Int. Cl.
*F16K 3/06* (2006.01)
*F16K 3/10* (2006.01)
*F16K 37/00* (2006.01)
*G05D 16/00* (2006.01)

(56) References Cited

U.S. PATENT DOCUMENTS

| | | | | |
|---|---|---|---|---|
| 6,142,163 A | * | 11/2000 | McMillin | G05D 16/2013 137/114 |
| 2010/0252121 A1 | * | 10/2010 | Saito | G05D 16/2013 137/14 |

* cited by examiner

VALVE CONTROL DEVICE

BACKGROUND OF THE INVENTION

1. Technical Field

The present invention relates to a valve control device of a vacuum valve of which opening degree is adjustable.

2. Background Art

In a vacuum processing device such as a CVD device, an inner chamber pressure normally varies according to a processing process stage (e.g., during, before, or after a process). Thus, in such a vacuum processing device, a vacuum valve of which opening degree is adjustable is provided between a vacuum chamber and a vacuum pump, thereby performing pressure adjustment. A valve described in Patent Literature 1 (Japanese Patent No. 4630994) has been known as an example of such a valve.

In general, this vacuum valve performs such control that a pressure deviation between a desired set pressure and a current pressure is calculated for controlling the inner chamber pressure to the set pressure and a feedback of the pressure deviation is added to a valve opening degree.

However, when pressure deviation feedback is performed with the same parameter, a pressure adjustment time varies among different pressure control regions, leading to a problem that pressure adjustment performance is not stabilized.

SUMMARY OF THE INVENTION

A valve control device configured such that a pressure measurement value of a chamber connected to a vacuum valve, a target pressure value of the chamber, and an opening degree measurement value of the vacuum valve are input to the valve control device and configured to control an opening degree of the vacuum valve based on a deviation between the pressure measurement value and the target pressure value, comprises: a storage configured to store a correlation between the opening degree of the vacuum valve and a conductance of a system including the vacuum valve; and a correction gain setting section configured to obtain, based on the correlation, a change rate of the conductance in association with an opening degree change at the input opening degree measurement value, thereby setting an inverse of the change rate as a correction gain. The opening degree of the vacuum valve is controlled based on the deviation and the correction gain.

A valve control device configured such that a pressure measurement value of a chamber connected to a vacuum valve, a target pressure value of the chamber, and an opening degree measurement value of the vacuum valve are input to the valve control device and configured to control an opening degree of the vacuum valve based on a deviation between the pressure measurement value and the target pressure value, comprises: a storage configured to store a correlation between the opening degree of the vacuum valve and a conductance of a system including the vacuum valve; and a correction gain setting section configured to obtain, based on the correlation, a change rate of the conductance in association with an opening degree change at the input opening degree measurement value, thereby setting, as a correction gain, a product of an inverse of the change rate, an inverse of the pressure measurement value, and the conductance at the opening degree measurement value. The opening degree of the vacuum valve is controlled based on the deviation and the correction gain.

The correction gain setting section sets the correction gain within a predetermined opening degree range, replaces a product of the inverse of the change rate in the correction gain and the conductance with a first constant at an opening degree exceeding an upper limit of the opening degree range, and replaces the product of the inverse of the change rate in the correction gain and the conductance with a second constant at an opening degree falling below a lower limit of the opening degree range.

The conductance is a conductance of a system including the vacuum valve, the chamber attached to the vacuum valve, and a vacuum pump attached to the vacuum valve.

The storage stores multiple correlations for different gas flow rates, and the correction gain setting section selects, based on a gas flow rate of the system, one correlation from the multiple correlations stored in the storage, thereby setting the correction gain based on the selected correlation.

According to the present invention, the pressure adjustment performance by the vacuum valve can be improved.

DETAILED DESCRIPTION OF THE EXEMPLARY EMBODIMENTS

Figure 1:
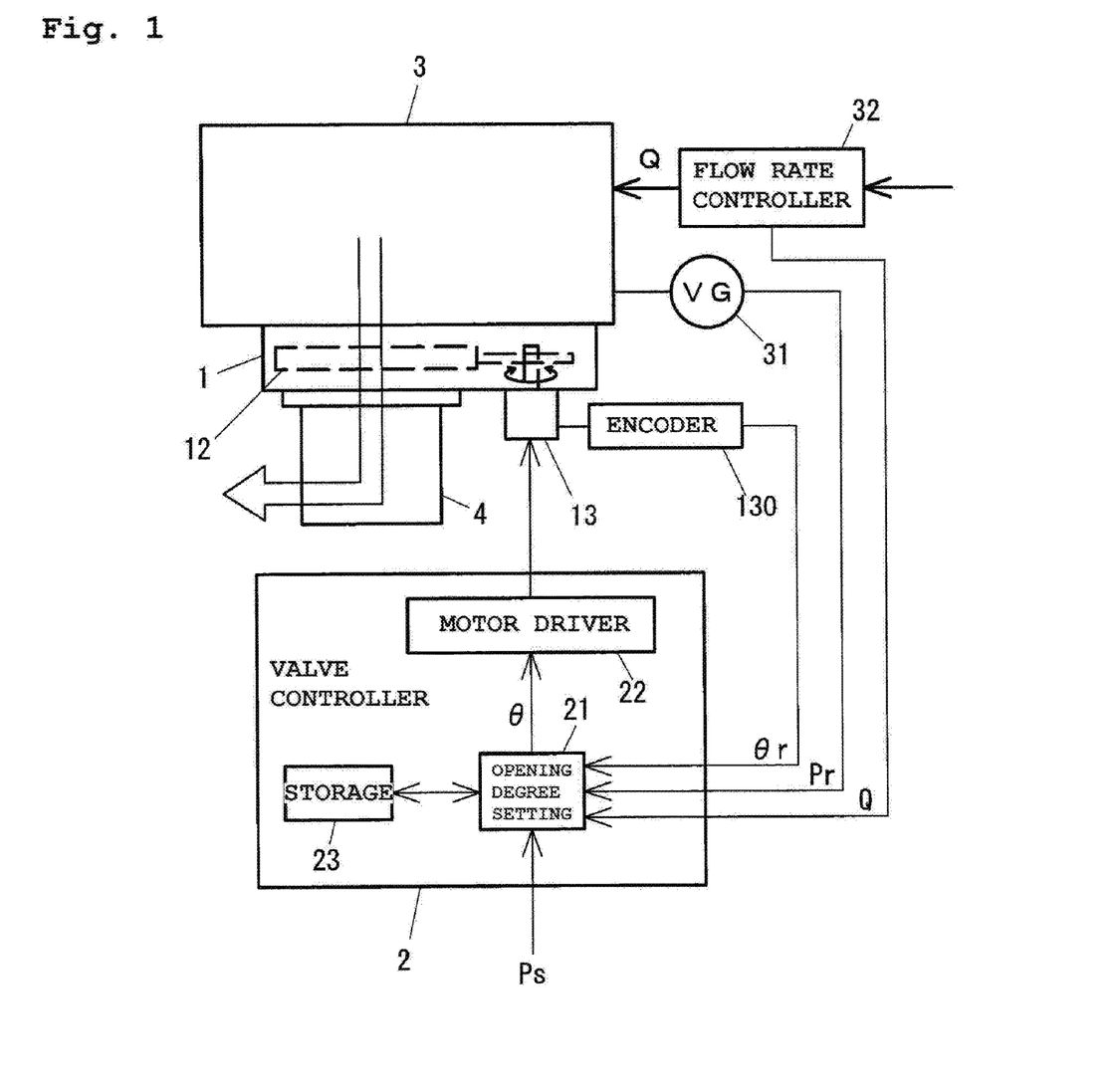
FIG. 1 is a block diagram for describing a valve control device.

Hereinafter, an embodiment of the present invention will be described with reference to the drawings. FIG. 1 is a block diagram for describing a valve control device of the present invention. In FIG. 1, a vacuum chamber 3, a vacuum valve 1, and a vacuum pump 4 form a vacuum system. The vacuum valve 1 is drivably controlled by a valve controller 2. A valve plate (a valve body) 12 provided at the vacuum valve 1 is openably driven by a motor 13. The motor 13 is provided with an encoder 130 configured to detect the opening degree of the valve plate 12. A detection signal (hereinafter referred to as an "opening degree measurement value θr") of the encoder 130 is input to the valve controller 2.

Gas such as process gas is introduced to the vacuum chamber 3 through a flow rate controller 32. Data of a gas flow rate Q [Pa·m$^3$/s] is output from the flow rate controller 32. The data of the gas flow rate Q is input to the valve controller 2. The pressure of the vacuum chamber 3 is measured by a vacuum gauge 31. Such a pressure measurement value Pr [Pa] is input to the valve controller 2.

The valve controller 2 configured to control the vacuum valve 1 includes an opening degree setting section 21, a motor driver section 22, and a storage 23. The opening degree setting section 21 is configured to set an opening degree command value θ based on a target pressure value Ps, the input opening degree measurement value θr, the input pressure measurement value Pr, and the input gas flow rate Q. Note that the target pressure value Ps is input from a higher-order controller (e.g., a control device configured to control the entirety of the vacuum system). The motor driver section 22 is configured to drivably control the motor 13 based on the opening degree command value θ.

Figure 2:
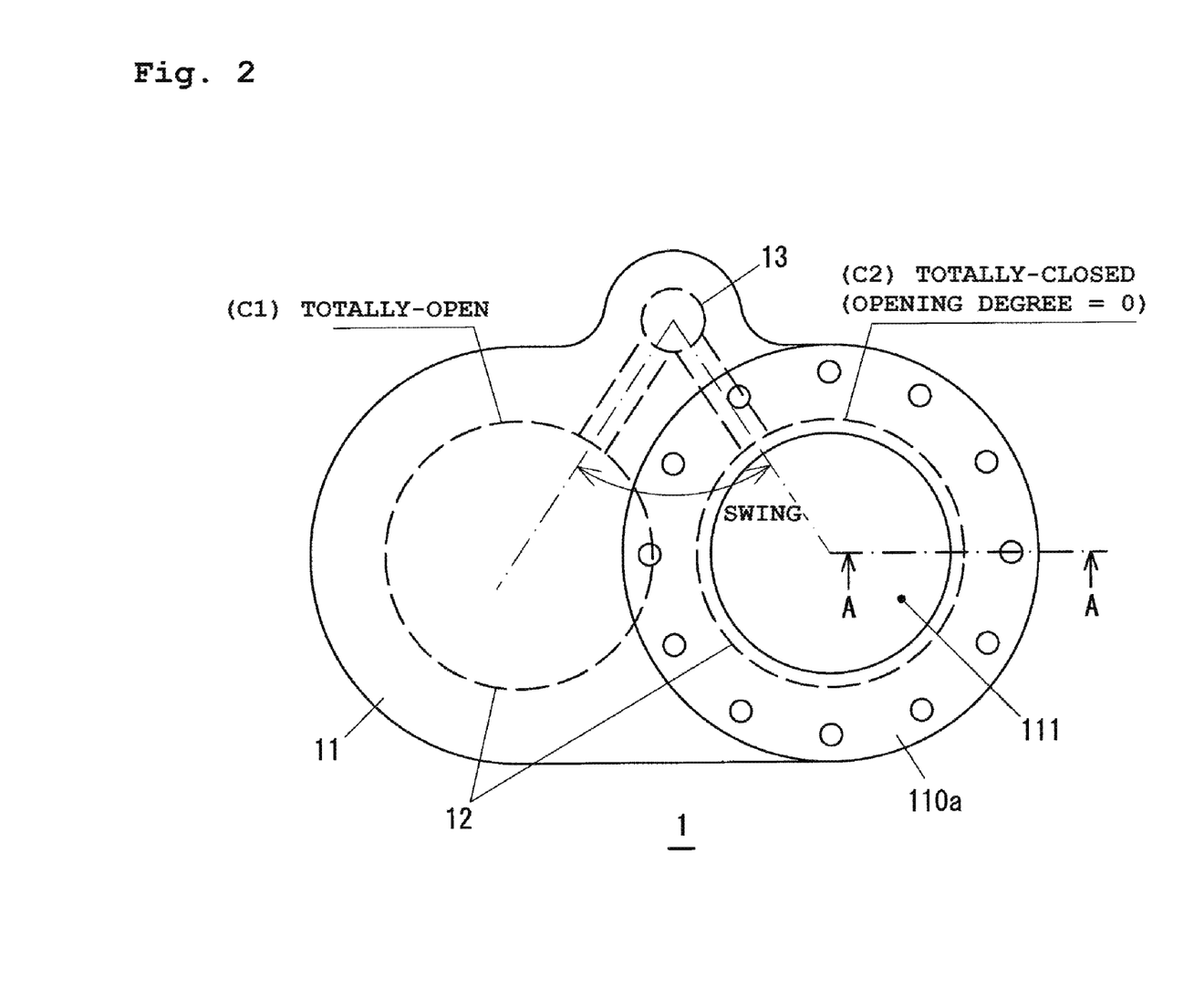
FIG. 2 is a plan view of an example of a vacuum valve.

FIG. 2 is a view of an example of the vacuum valve 1, the view being a plan view of the vacuum valve 1. The valve plate 12 provided in a housing 11 is swingably driven by the motor 13. Front and back sides of the housing 11 are provided respectively with flanges 110a, 110b (see FIG. 3). The valve plate 12 is slidably movable to an optional position between a totally-closed position C2 facing the entirety of a valve opening 111 and a totally-open position C1 not facing the valve opening 111 at all.

The state of closing the valve opening 111 by the valve plate 12 is represented by a parameter called an opening degree. The opening degree is a ratio in percent, the ratio being (Swing Angle of Valve Plate):(Swing Angle from Totally-Closed State to Totally-Open State of Valve Opening 111). The totally-closed position C2 in FIG. 2 is an opening degree of 0%, and the totally-open position C1 is an opening degree of 100%. That is, the opening degree of the valve plate 12 is adjusted such that the conductance of the vacuum valve 1 is controlled.

Figure 3:
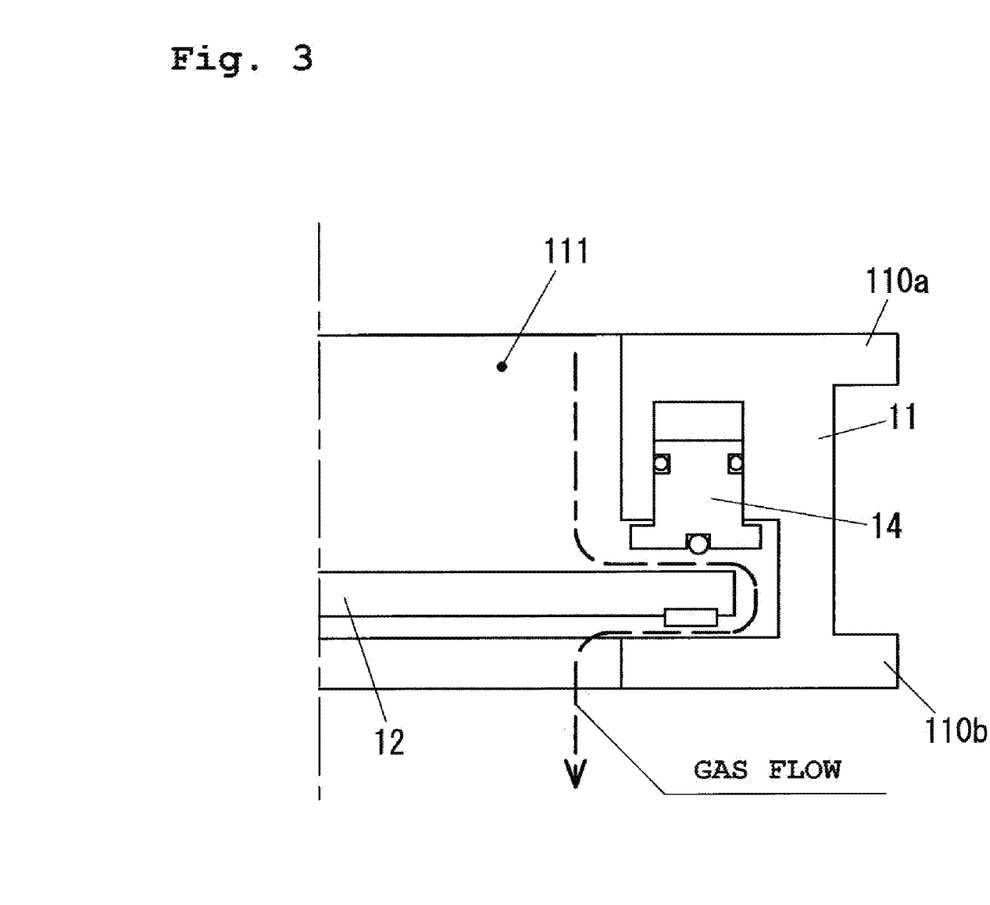
FIG. 3 is a sectional view along an A-A line of FIG. 2.

FIG. 3 is a sectional view along an A-A line of FIG. 2. A seal ring 14 movable up and down is provided at the housing 11. Note that a drive mechanism of the seal ring 14 is not shown in the figure. FIG. 3 illustrates a state in which the seal ring 14 has been moved to the uppermost position, and a gas flow path as indicated by a dashed line is formed. In the case of bringing the vacuum valve 1 to a closed state, the seal ring 14 is moved downward to totally close the gas flow path.

Figure 4:
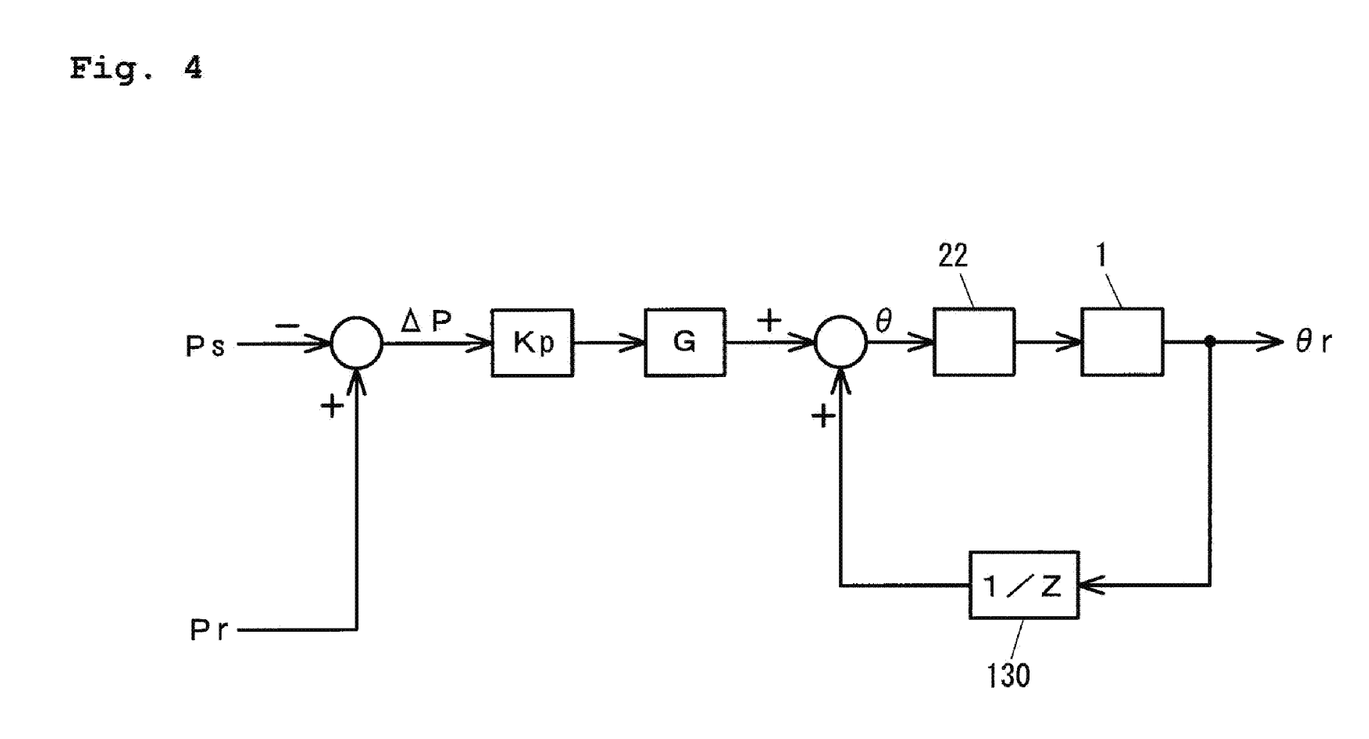
FIG. 4 is a control block diagram of an example of valve opening degree control.

FIG. 4 is a control block diagram of an example of valve opening degree control performed by the valve controller 2. The opening degree setting section 21 calculates a pressure deviation ΔP (=Pr−Ps) as a difference between the pressure measurement value Pr and the target pressure value Ps. Kp indicates a proportional gain for the pressure deviation ΔP. Further, in the present embodiment, a correction gain G is adapted as described below. Then, the opening degree setting section 21 outputs, to the motor driver section 22, the opening degree command value θ obtained by addition of ΔP·Kp·G to the opening degree measurement value θr measured by the encoder 130. The motor driver section 22 drives the valve plate 12 of the vacuum valve 1 based on the opening degree command value θ. Note that the case of the proportional gain will be described in the present embodiment, the present invention is also applicable to an integral component, a differential component, and other types of feedback control.

The correction gain G in FIG. 4 is set based on an expression for exhaust as shown in Expression (1). In Expression (1), S (Q,θ) is the conductance S of the vacuum system including the vacuum chamber 3, the vacuum valve 1, and the vacuum pump. Using the exhaust speed Se of the vacuum pump and the conductance (hereinafter referred to as a "valve conductance") C of the vacuum valve 1, S(Q,θ) is represented by "(1/S)=(1/Se)+(1/C)." In general, the conductance S depends, as in S(Q,θ), not only on the opening degree θ but also on the gas flow rate Q. V [me] is the volume of the chamber, and P [Pa] is the inner pressure of the vacuum chamber 3.

$$Q=V\cdot(dP/dt)+P\cdot S(Q,\theta) \quad (1)$$

In the present embodiment, a change dθ in the opening degree θ and a pressure change dP in the vacuum system are obtained from Expression (1). Expression (1) is modified as follows, provided that a flow rate change dQ/dt is zero.

When both sides of Expression (1) are subjected to temporal differentiation, $$dQ/dt=V\cdot(dP^2/dt^2)+(dP/dt)\cdot S(Q,\theta)+P\cdot(dS/dt)$$

Ignoring a secondary differentiation term, when dQ/dt=0, $$(dP/dt)\cdot S+P\cdot(dS/d\theta)(d\theta/dt)=0$$

$$d\theta=-\{(1/P)\cdot S/(dS/d\theta)\}\cdot dP \quad (2)$$

Expression (2) is an expression as in dθ=−G·dP, and shows that the opening degree change dθ in association with the pressure change dP is −G·dP. A minus sign is assigned because an increase in the opening degree θ results in a decrease in a pressure P. Meanwhile, the pressure deviation ΔP in FIG. 4 is defined as in ΔP=Pr−Ps, and therefore, opening degree control for ΔP>0 (Pr>Ps) is the control of increasing the opening degree θ. Conversely, opening degree control for ΔP<0 (Pr<Ps) is the control of decreasing the opening degree θ. Thus, the correction gain G for the pressure deviation ΔP is set as in Expression (3).

$$G=(1/P)\cdot S/(dS/d\theta) \quad (3)$$

Figure 5:
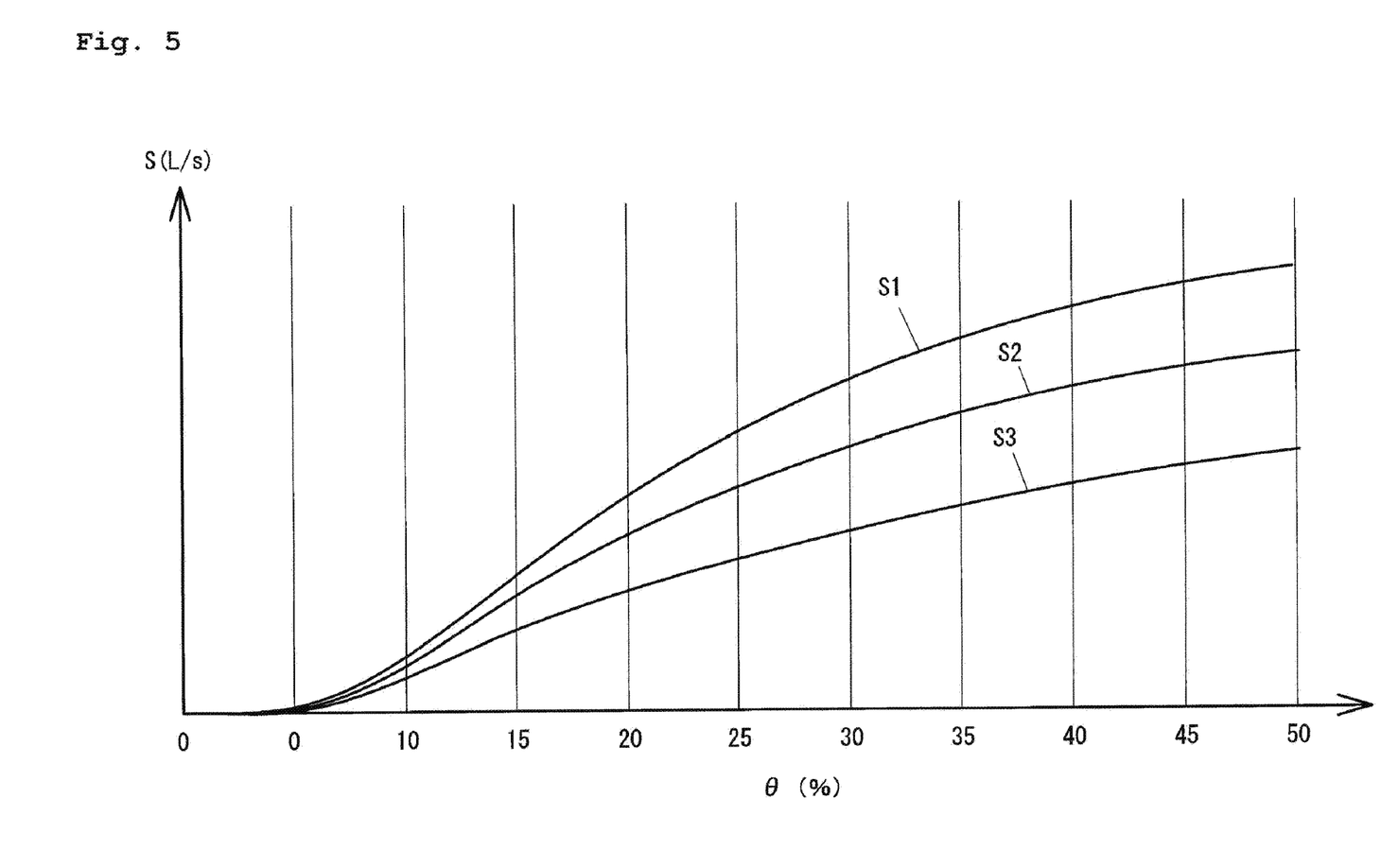
FIG. 5 is a graph of an example of a conductance S.

FIG. 5 is a graph of an example of the conductance S. In FIG. 5, each of conductances S1, S2, S3 for three types of gas flow rates Q1, Q2, Q3 are shown. Each of lines indicated by reference characters S1, S2, S3 shows a correlation between the opening degree θ and the conductance of the system. A conductance S(θ) for each of the multiple flow rates is stored in the storage 23 illustrated in FIG. 1. Needless to say, a two-dimensional map S(Q,θ) may be used. In this case, the conductance S1 shown in FIG. 5 corresponds to data S(Q1,θ) of a single row (the gas flow rate Q1) of the map S(Q,θ).

A change rate dS/dθ of the conductance S in association with the opening degree change indicates the slope of a tangent of a line of the conductance S. As shown in FIG. 5, the change rate dS/dθ of the conductance S varies depending on the magnitude of opening degree θ. For example, for the conductance S2, the slope (dS/dθ) of the tangent at θ=25% is greater than that (dS/dθ) at θ=40%. This means that the degree of conductance change in association with the opening degree change is greater in the case of θ=25% than in the case of θ=40%. That is, it can be seen that an opening degree control amount in association with the same conductance change may be smaller in the case of θ=25% than in the case of θ=40%. Thus, the opening degree control amount for the same pressure deviation ΔP is smaller in the case of θ=25% than in the case of θ=40%.

The correction gain G includes, in the form of 1/(dS/dθ), influence of the change rate dS/dθ in association with the above-described opening degree control amount. Moreover, (1/P) in the correction gain G contributes to an increase in the correction gain G with a decrease in the pressure P. That is, a lower-pressure region results in a greater opening degree control amount for the pressure deviation ΔP. S in the correction gain G contributes to an increase in the opening degree control amount for the pressure deviation ΔP with an increase in the conductance S. That is, a greater opening degree θ results in a greater opening degree control amount.

Note that in the present embodiment, the correction gain G is the product of (1/P), S, and 1/(dS/dP) as in Expression (3), but the present invention is not limited to above. For example, 1/(dS/dP) may be used as the correction gain G.

Figure 6A:
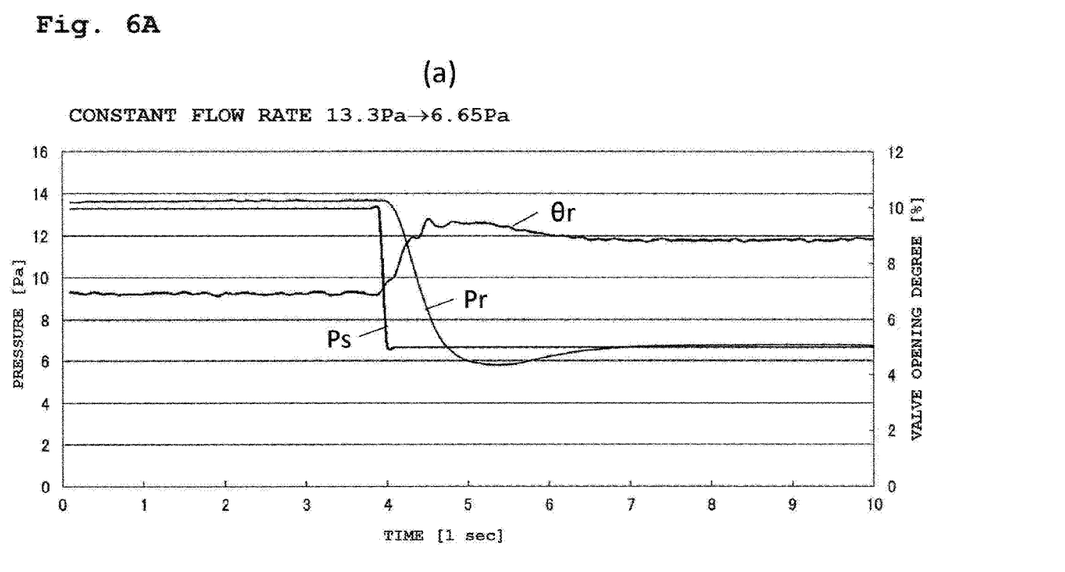
FIGS. 6A and 6B are graphs showing a temporal change in a pressure measurement value Pr, a target pressure value Ps, and an opening degree measurement value θr in pressure adjustment operation not using a correction gain G.
Figure 6B:
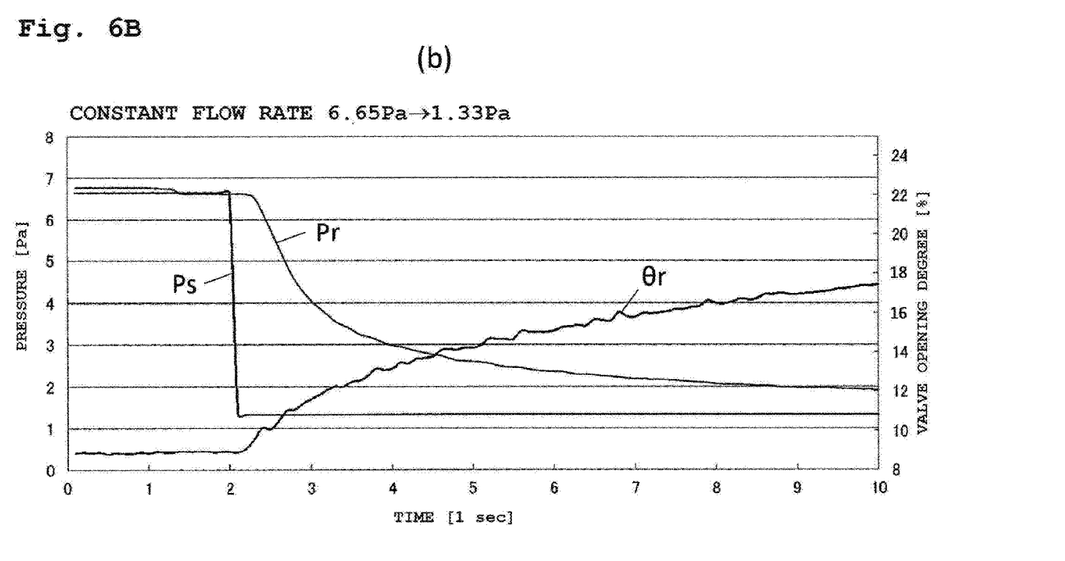
Figure 7A:
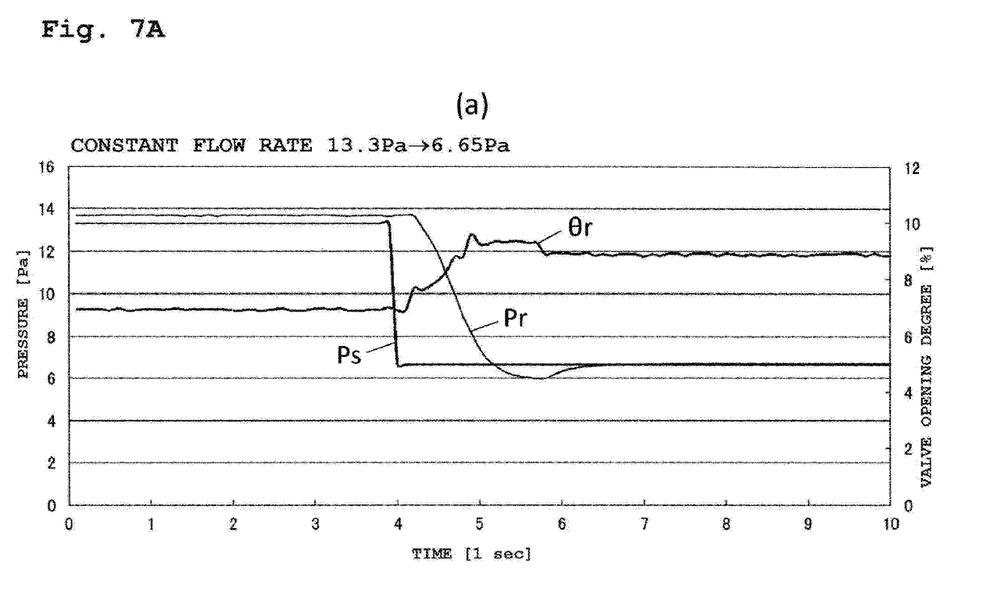
FIGS. 7A and 7B are graphs showing a temporal change in the pressure measurement value Pr, the target pressure value Ps, and the opening degree measurement value θr in pressure adjustment operation in the case of using the correction gain G.
Figure 7B:
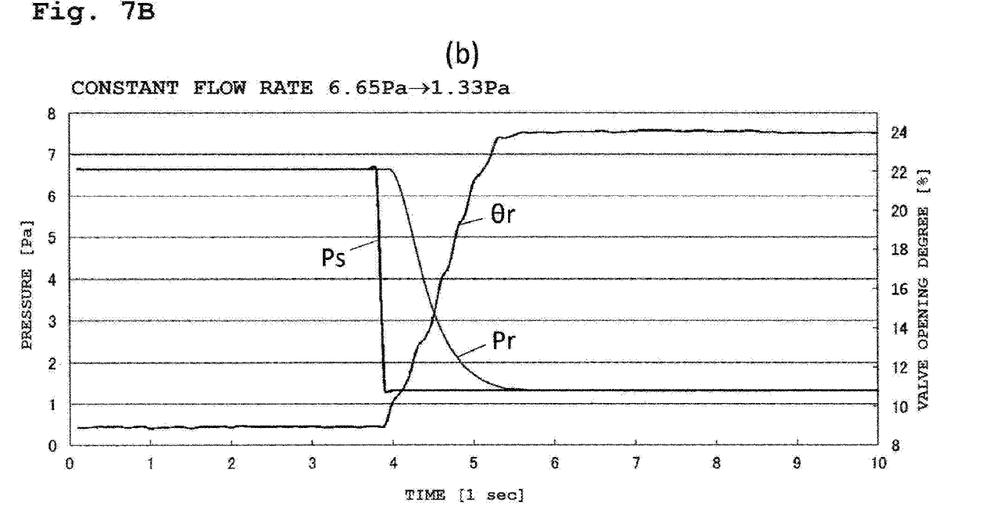

FIGS. 6A, 6B, 7A, and 7B are graphs showing a temporal change in the pressure measurement value Pr, the target pressure value Ps, and the opening degree measurement value θr when pressure adjustment operation is performed. FIGS. 6A and 6B are the graphs showing a pressure adjustment situation in the case of performing valve control by proportional control Kp without employing the correction gain G. On the other hand, FIGS. 7A and 7B show a pressure adjustment situation in the case of using the correction gain G in addition to Kp. In any case, a case (a) where the target pressure value Ps is changed from 13.3 Pa to 6.65 Pa with a constant flow rate and a case (b) where the target pressure value Ps is changed from 6.65 Pa to 1.33 Pa with the constant flow rate are shown.

First, the case where the target pressure value Ps is changed from 13.3 Pa to 6.65 Pa is compared. In this case, when a time until the pressure measurement value Pr reaches 6.65 Pa from a setting change is compared, such a time is about three seconds in FIG. 6A and about 2.5 seconds in FIG. 7A.

On the other hand, in the case where the target pressure value Ps is changed from 6.65 Pa to 1.33 Pa in a lower-pressure region, the pressure measurement value Pr is 1.33 Pa in about 1.5 seconds in FIG. 7B, but does not reach 1.33 Pa even after a lapse of eight seconds in the case of FIG. 6B. As will be clearly seen from the figures, pressure adjustment performance is improved by means of the correction gain G.

Figure 8:
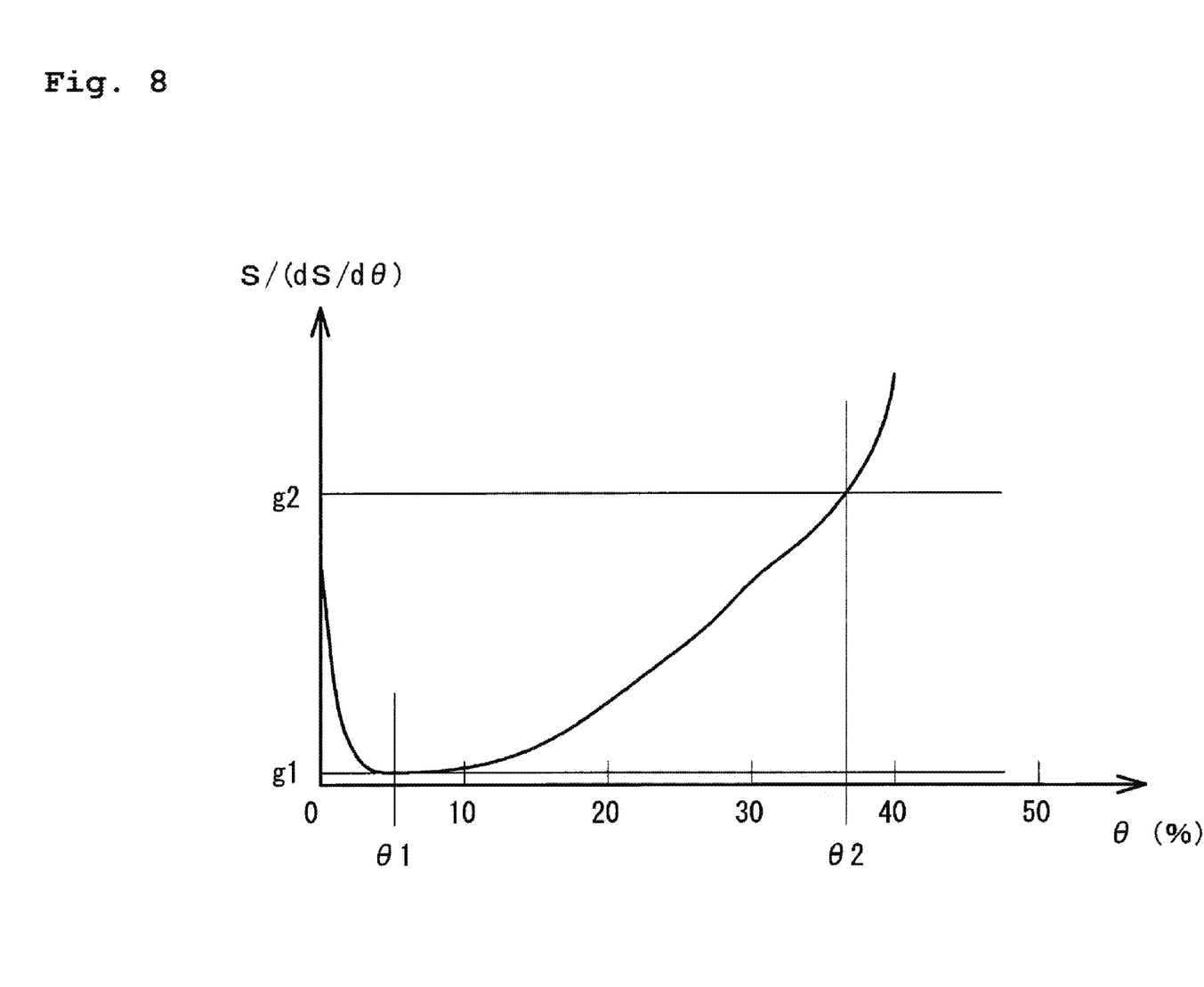
FIG. 8 is a graph showing a change in S/(dS/dθ) in association with an opening degree θ.

FIG. 8 is a graph showing a change in $S/(dS/d\theta)$ in association with the opening degree $\theta$, the horizontal axis representing the opening degree $\theta$ and the vertical axis representing $S/(dS/d\theta)$. As shown in FIG. 8, $S/(dS/d\theta)$ decreases, with respect to a boundary of a predetermined opening degree $\theta 1$, with an increase in the opening degree $\theta$ in the case of $\theta<\theta 1$, and increases with an increase in the opening degree $\theta$ in the case of $\theta>\theta 1$.

In the vacuum valve 1 illustrated in FIG. 2, the valve plate 12 is swingably driven to adjust the opening degree θ, thereby adjusting the valve conductance. In this case, the seal ring 14 is moved upward as illustrated in FIG. 3. Thus, even in the case of an opening degree θ of 0%, gas flows around the periphery of the valve plate 12 as indicated by the dashed line. That is, even when θ=0, the valve conductance C is C>0. Thus, in a region with an extremely-small opening degree θ, the above-described gas flow becomes dominant for the conductance. On the other hand, in the case of a great opening degree θ, the size of the opening area of the valve opening 111 becomes dominant for the valve conductance C.

As will be seen from FIG. 5, a situation of a change in the slope $(dS/d\theta)$ of a conductance curve is different between the right and left sides with respect to a boundary of around θ=7 to 8%. The slope gradually becomes smaller with an increase in the opening degree θ in the right region, and gradually becomes smaller with a decrease in the opening degree θ in the left region. Thus, $S/(dS/d\theta)$ shows a change as shown in FIG. 8. The opening degree $\theta 1$ of FIG. 8 shows the boundary between these two regions. Note that the value of the opening degree $\theta 1$ is set based on the valve conductance C of the vacuum valve 1.

Moreover, as shown in FIG. 5, in the region with a great opening degree θ (e.g., equal to or greater than 40%), the degree of change in the conductance S is extremely smaller than the degree of change in the opening degree θ (i.e., a change in the opening area of the valve opening 111). That is, in this opening degree region, the exhaust speed Se of the vacuum pump 4 becomes dominant for the conductance S of the vacuum system. As described above, the conductance S of the vacuum system is represented by "$(1/S)=(1/Se)+(1/C)$," and therefore, exceedance of the exhaust speed Se is not caused even when the valve conductance C is increased.

As described above, in the opening degree region ($\theta<\theta 1$) where the above-described gas flow becomes dominant for the conductance and the opening degree region ($\theta>\theta 2$) where the exhaust speed Se becomes dominant, opening degree dependency of the conductance S is smaller, and for this reason, control stability might be impaired in the case of employing the correction gain G represented by Expression (3). Thus, in these opening degree regions, $S/(dS/d\theta)$ is set as a constant. That is, in an opening degree region of $\theta 1 \leq \theta \leq \theta 2$, the correction gain G calculated by Expression (3) is used as the correction gain G. In the opening degree region of $\theta<\theta 1$ and the opening degree region of $\theta>\theta 2$, the $S/(dS/d\theta)$ term is replaced with the constant. Note that the opening degree $\theta 2$ is an opening degree at a boundary with the opening degree region where the exhaust speed Se is dominant.

In an example shown in FIG. 8, constants g1, g2 are set continuously to a line of $S/(dS/d\theta)$ within a range of $\theta 1 \leq \theta \leq \theta 2$.

In the above-described embodiment, the pressure measurement value Pr of the vacuum chamber 3 connected to the vacuum valve 1, the target pressure value Ps of the vacuum chamber 3, and the opening degree measurement value θr of the vacuum valve 1 are input to the valve controller 2, and the valve controller 2 controls the opening degree θ of the vacuum valve 1 based on the deviation between the pressure measurement value Pr and the target pressure value Ps. Moreover, in the storage 23, the correlation $S(\theta)$ between the opening degree θ of the vacuum valve 1 and the conductance S of the system including the vacuum valve 1 is stored. Further, the opening degree setting section 21 obtains, based on the correlation $S(\theta)$, the change rate $(dS/d\theta)$ of the conductance S in association with the opening degree change at the input opening degree measurement value θr, thereby setting the inverse of the change rate as the correction gain G. The opening degree θ of the vacuum valve 1 is controlled based on the above-described deviation and the correction gain G.

By use of the correction gain G based on the conductance S of the system as described above, the opening degree change amount for the pressure deviation can be more accurately set, and therefore, the pressure of the vacuum chamber 3 can be more quickly changed to the target pressure value Ps.

Note that the product of the inverse of the change rate $(dS/d\theta)$, the inverse of the pressure measurement value Pr, and the conductance S at the opening degree measurement value θr, i.e., $(1/P) \cdot S/(dS/d\theta)$, is more preferably set as the correction gain G.

The conductance of the vacuum valve 1 or the conductance of the system including the vacuum valve 1 and the vacuum pump 4 may be used as the conductance S. Preferably, the conductance of the system including the vacuum valve 1, the vacuum chamber 3, and the vacuum pump 4 may be used. This can more accurately set the correction gain G.

Moreover, as shown in FIG. 8, the correction gain G represented by Expression (3) may be used within a predetermined opening degree range ($\theta 1 \leq \theta \leq \theta 2$), $S/(dS/d\theta)$ may be replaced with the constant g2 at the opening degree θ ($>\theta 2$) exceeding the upper limit θ2 of the opening degree range, and $S/(dS/d\theta)$ may be replaced with the constant g1 at the opening degree θ ($<\theta 1$) falling below the lower limit θ1 of the opening degree range. With these settings, the control stability in the regions of θ<θ1 and θ>θ2 is improved.

Further, the correlation (the line of the conductance S) for each of the multiple gas flow rates as shown in FIG. 5 may be stored in the storage 23, one correlation may be selected from the multiple correlations based on the gas flow rate Q of the system, and the correction gain may be set based on the selected correlation. The correction gain G may be set by the representative conductance S(θ) which is not based on the gas flow rate. However, the conductance S(Q,θ) corresponding to each of the gas flow rates is used as described above so that opening degree control accuracy can be more enhanced. Note that FIG. 1 illustrates such a configuration that the measurement value of the gas flow rate Q is input to the valve controller 2, but the gas flow rate Q may be estimated using Expression (1) as described above.

Note that in an example illustrated in FIG. 1, the valve controller 2 configured to perform the above-described opening degree control is provided alone. However, the valve controller 2 may be provided integrally with the vacuum valve 1, or may be incorporated in a controller of the vacuum pump 4 or a main controller of a vacuum device.

Various embodiments and variations have been described above, but the present invention is not limited to these contents. Other forms conceivable within the scope of the technical idea of the present invention are also included in the scope of the present invention.

What is claimed is:

1. A valve control device configured such that a pressure measurement value of a chamber connected to a vacuum valve, a target pressure value of the chamber, and an opening degree measurement value of the vacuum valve are input to the valve control device and configured to control an opening degree of the vacuum valve based on a deviation between the pressure measurement value and the target pressure value, comprising:
   a storage configured to store a correlation between the opening degree of the vacuum valve and a conductance of a system including the vacuum valve; and
   a correction gain setting section configured to obtain, based on the correlation, a change rate of the conductance in association with an opening degree change at the opening degree measurement value, thereby setting an inverse of the change rate as a correction gain,
   wherein the opening degree of the vacuum valve is controlled based on the deviation and the correction gain.

2. The valve control device according to claim 1, wherein the conductance is a conductance of a system including the vacuum valve, the chamber attached to the vacuum valve, and a vacuum pump attached to the vacuum valve.

3. The valve control device according to claim 1, wherein the storage stores multiple correlations for different gas flow rates, and
   the correction gain setting section selects, based on a gas flow rate of the system, one correlation from the multiple correlations stored in the storage, thereby setting the correction gain based on the selected correlation.

4. A valve control device configured such that a pressure measurement value of a chamber connected to a vacuum valve, a target pressure value of the chamber, and an opening degree measurement value of the vacuum valve are input to the valve control device and configured to control an opening degree of the vacuum valve based on a deviation between the pressure measurement value and the target pressure value, comprising:
   a storage configured to store a correlation between the opening degree of the vacuum valve and a conductance of a system including the vacuum valve; and
   a correction gain setting section configured to obtain, based on the correlation, a change rate of the conductance in association with an opening degree change at the opening degree measurement value, thereby setting, as a correction gain, a product of an inverse of the change rate, an inverse of the pressure measurement value, and the conductance at the opening degree measurement value,
   wherein the opening degree of the vacuum valve is controlled based on the deviation and the correction gain.

5. The valve control device according to claim 4, wherein the correction gain setting section
   sets the correction gain within a predetermined opening degree range,
   replaces a product of the inverse of the change rate in the correction gain and the conductance with a first constant at an opening degree exceeding an upper limit of the opening degree range, and
   replaces the product of the inverse of the change rate in the correction gain and the conductance with a second constant at an opening degree falling below a lower limit of the opening degree range.

6. The valve control device according to claim 4, wherein the conductance is a conductance of a system including the vacuum valve, the chamber attached to the vacuum valve, and a vacuum pump attached to the vacuum valve.

7. The valve control device according to claim 4, wherein the storage stores multiple correlations for different gas flow rates, and
   the correction gain setting section selects, based on a gas flow rate of the system, one correlation from the multiple correlations stored in the storage, thereby setting the correction gain based on the selected correlation.

* * * * *